J. W. Cochran,
Reciprocating Saw Mill,
No 6,653.
Patented Aug. 21, 1849.
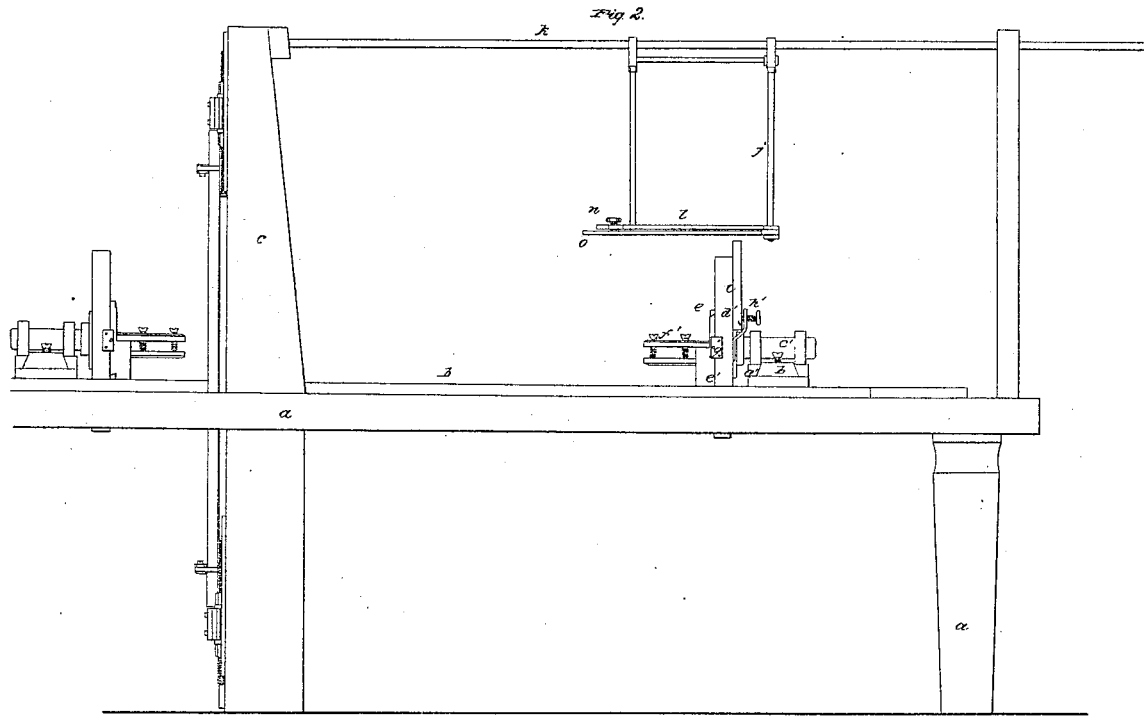
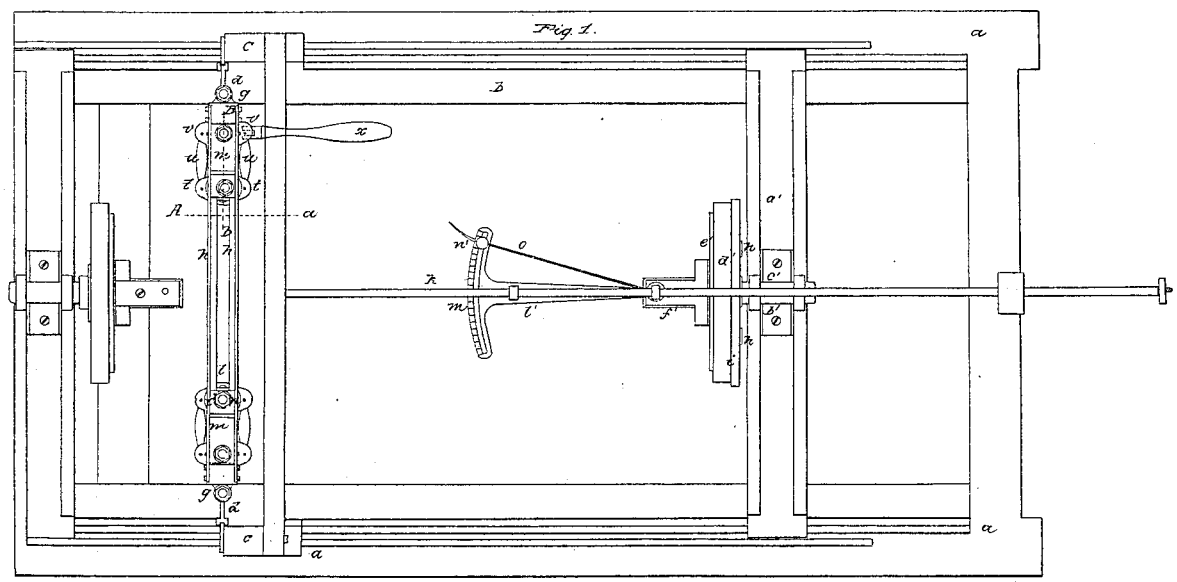

J. W. Cochran,
Reciprocating Saw-Mill,
N° 6,653. Patented Aug. 21, 1849.
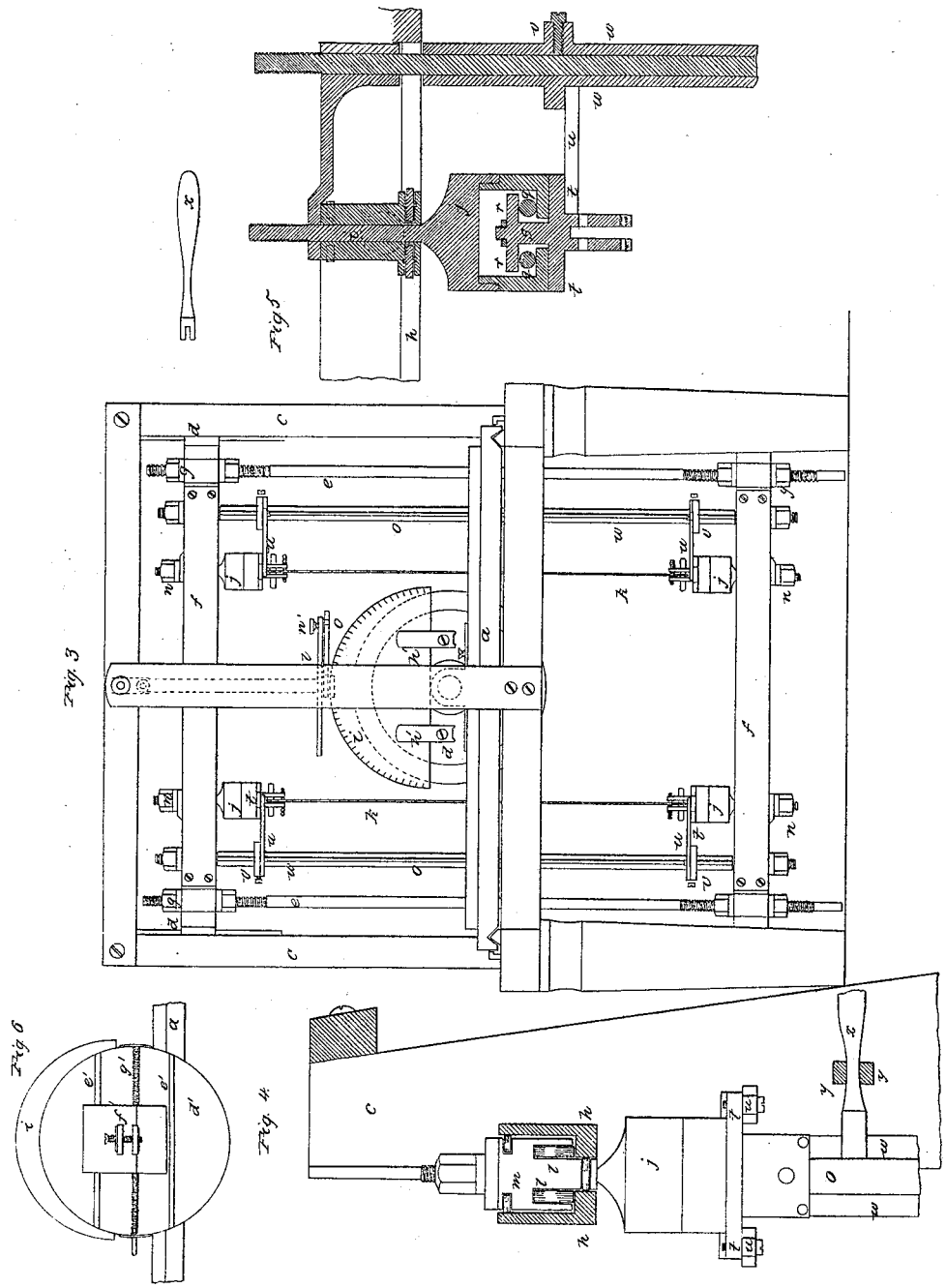

UNITED STATES PATENT OFFICE.

JOHN W. COCHRAN, OF LONDON, ENGLAND.

MILL FOR SAWING SHIP-TIMBER, &c.

Specification of Letters Patent No. 6,653, dated August 21, 1849.

*To all whom it may concern:*

Be it known that I, JOHN W. COCHRAN, a citizen of the United States, now residing in London, England, have invented certain new and useful Improvements in Sawmills for Cutting Ship-Timbers and which are Applicable to the Cutting of Timbers for other Purposes, and that the following is a full, clear, and exact description of the principle or character which distinguishes them from all other things before known and of the manner of making, constructing, and using the same, reference being had to the accompanying drawings, making part of this specification, in which—

Figure 1 is a top view; Fig. 2, a side elevation; Fig. 3, a front elevation. Figs. 4 and 5, are sections on the lines (A *a*) and (B *b*) of Fig. 1. The same letters indicate like parts in all the figures.

The first part of my invention relates to the mounting of saws in a saw gate in such manner as to admit of turning on their axis and to slide, laterally for the purpose of cutting timbers in curved or diagonal lines, and this part of my invention consists in hanging the saws in swivels, sustained on spherical friction rollers, that is, the saw at each end is attached to a spindle which has a flanch resting on spherical friction rollers that in turn roll on an internal flanch of a box that surrounds and sustains the spindle and which in turn is provided with a spindle that passes through a slide adapted to traverse freely on the cross head of the saw gate and provided with a screw nut or other equivalent for giving the required tension to the saw, the said slide being also provided with friction rollers that run on flanches projecting inwards from two bars that constitute each cross head of the saw gate.

The second part of my invention relates to the mode of turning saws mounted on stretchers or otherwise adapted to swivel on the gate, and this part of my invention consists in connecting the swivels or other turning apparatus to which the saws are attached by means of feathers or ribs on a tumbling shaft parallel with the saw and connected with the swivels by means of arms or parallel motions, when this is combined with keys in which the feathers or ribs on the tumbling shaft slide during the motions of the saw gate, and by means of which the saw can be turned in any desired direction.

The third part of my invention relates to the mode of determining the bevels of cuts on saw mills, in which the log or timber is so hung as to admit of sliding laterally and turning on any determined axis of motion, and this part of my invention consists in determining the bevel to be cut by means of a graduated circular plate attached to the mandrel that carries the log, when this is combined with a horizontal hinged bar on a horizontally sliding frame so that when the hinged bar is set to any given angle for the determined bevel and the graduated plate is set to the bar, the log or timber may be moved that as the log advances towards the saw the given graduation on the plate may be made to follow the hinged bar, and after a length has been cut the sliding frame to which the bar is hinged may be moved for a continuation of the operation.

In the accompanying drawings (*a*) represents the frame work of a saw mill which may be made in any desired manner adapted to the intended purpose, and (*b*) a carriage which may also be made and operated in any desired manner known to machinists. The frame of the mill is provided as usual with fender posts (*c*, *c*) having slides in which the saw gate (*d*) is hung, and this saw gate is composed of two vertical rods (*e*, *e*) and two cross heads (*f*, *f*) through the ends of which the vertical rods pass and to which they are secured by screws and counter nuts (*g*). The cross heads between the points of attachment to the vertical rods are made each of two parallel bars with horizontal flanches (*h*, *h*) that face one another and which are at such distance apart as to admit of the free passage of the spindle (*i*) of the swivel box (*j*) of the saw (*k*). These flanches constitute ways on which run the friction rollers (*l*, *l*) of a sliding piece (*m*) which is fitted to slide freely between the parallel bars, and which is pierced with two vertical holes, one near each end—through one of which passes the spindle of the swivel box provided with a screw nut (*n*) above for stretching the saw, and in the other plays the journal of a tumbling shaft (*o*). By means of a similar arrangement at each end of the saw gate both ends of the saw and tumbling shaft are at all times kept at the same distance apart, and may freely traverse from side to side of the gate. The swivel box ($j$) at each end of the saw ($k$) is provided with an internal horizontal flanch ($p$) on the upper surface of which are placed spherical friction rollers ($q$), and on these rollers rests a corresponding flanch ($r$) on a spindle ($s$) to which the saw is attached in any desired manner. The spindle ($s$) is provided with two arms ($t, t$) on opposite sides of the axis to the ends of which are jointed two parallel connecting rods ($u, u$) which in turn are jointed to corresponding arms ($v, v$) on the tumbling shaft. There being a corresponding arrangement at each end of the saw and tumbling shaft it will be obvious that as the tumbling shaft is vibrated a like motion will be imparted to the two spindles to which the ends of the saw are attached and hence to the saw itself.

For the purpose of vibrating or giving the required position to the tumbling shaft and therefore to the saw connected therewith, it (the tumbling shaft) is provided with a feather ($w$) extending out radially, and from end to end, or of greater length than the range of motion of the saw gate; and this feather fits in a slot in the end of a key or hand lever ($x$) (see the separate figure) which is placed between two horizontal bars ($y\ y$) attached to the fender posts, the said key or lever being adapted to slide freely between the said bar. The attendant slips this key between the two bars with the slot embracing the feather, and with it is enabled to turn the tumbling shaft and with it the saw in any desired direction. By means of this key and lever the attendant can also make the tumbling shaft and saw traverse the gate when the gate is in motion, for then the key acts equally on the whole length of the feather. The tumbling shaft is provided if desired with another feather ($w$) opposite to the one described and a like set of parallel bars ($y, y$) are put on the other side of the fender posts, by which means the tumbling shaft can be acted upon by means of two keys or levers. The tumbling shaft should be placed at such distance from the saw as to admit of cutting off such thicknesses from the log as may be desired, and this distance can be varied at any time by simply changing the connecting parallel links.

On the head block ($a'$) of the carriage, see Fig. 6, which is a full view of mandrel chuck, there is a sliding puppet ($b'$) adapted to sliding on the head block so that it can traverse at right angles to the motion of the carriage. And on this puppet is hung a mandrel ($c'$) to which is secured a chuck plate ($d'$) the face of which is provided with ways ($e'$) in which slides a clamp ($f'$) to which the end of the log is to be secured. The position of this clamp on the face relatively to the axis of rotation of the mandrel is governed by a screw ($g'$) which turns in bracket pieces on the face of the chuck plate and tapped in the clamp, so that by the turning of this screw the clamp can be made to slide along the face of the said chuck. By this means, (the log being sustained at the other end in any manner which will admit of the required movement) the timber can be rotated centrally or eccentrically, and moved from side to side.

The back of the chuck plate is provided with another clamp or clamps ($h'$) by means of which a semi-circular plate ($i'$) is secured, and the face of this toward the periphery is graduated with radial divisions of any degree required. And above this is hung the sliding frame ($j'$) adapted to slide on a longitudinal horizontal bar ($k'$). The base piece ($l'$) of this sliding frame is provided at one end with a segment slot ($m'$), the radius of which should be equal to the radius of the graduated semi-circular plate ($i'$) or any proportionate portion thereof, in which slides a temper screw ($n'$) that is tapped into a straight bar ($o'$) which is jointed to the base piece of the sliding frame at the axis of the segment slot ($m'$), so that this bar can be turned and secured to any angle desired within the capacity of the segment slot.

In commencing the operation of cutting the log, the sliding frame is moved to the required position, and the hinged bar placed at an angle corresponding with the level to be cut. The bar in starting must be fixed to the segment slot standing over a certain mark upon the graduated plate which shall indicate the angle to be cut, and as the carriage with the chuck advances, the rotary motion of the log upon the centers must be so arranged as to keep the said mark upon the graduated plate always immediately under the edge of the hinged bar. When the mark upon the log indicating that the bevel of cutting is to be altered has arrived at the saws the corresponding mark upon the graduated plate will have come under the center of the hinged bar. The frame must then be slid forward upon the bar upon which it is hung and again fixed; the hinged bar being adjusted to the required angle of bevel and its edge brought over the corresponding mark upon the graduated bar, the operation goes on as before, and by so adjusting the parts as described from time to time to suit the required bevels to be cut on the sides of the log the operation is perfected.

I have thus described the mode of applying the principle of my invention which I deem the best; but it will be understood that I do not confine myself to any particular mode, as various changes may be made in the details without varying the principle or character which distinguishes my improvements from all other things before known.

What I claim as my invention and desire to secure by Letters Patent is—

1. The mode of turning saws mounted upon stretchers or otherwise within the saw gates by means of feathers or ribs with the arms or parallel motions connected therewith, and operated by keys as hereinbefore described.

2. And I also claim the mode of determining the bevels of cuts to be made in my said improved sawing machine, by means of a graduated semi-circular board and sliding frame, as hereinbefore described.

J. W. COCHRAN.

Witnesses:
JAMES M. CURLEY,
JOSEPH MARQUETTE.